July 14, 1931.         A. JOHNSON         1,814,220
PARACHUTE CONSTRUCTION
Filed Dec. 27, 1927
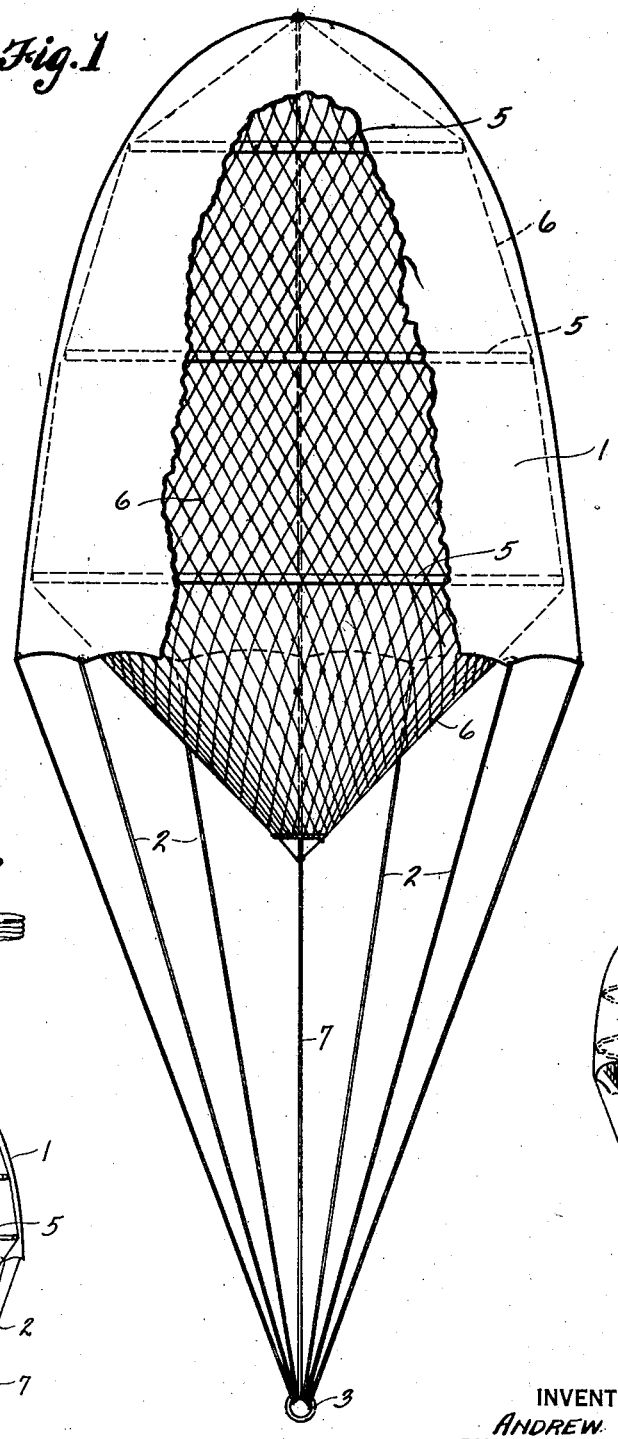
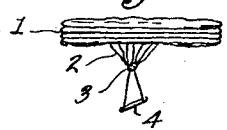
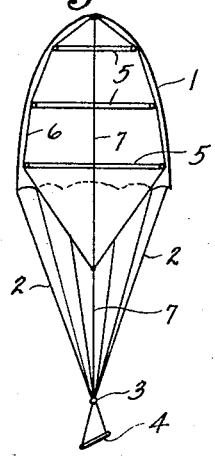
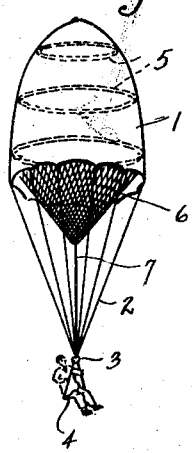
INVENTOR
ANDREW JOHNSON
BY
Cook & Robinson
ATTORNEY Patented July 14, 1931

1,814,220

UNITED STATES PATENT OFFICE

ANDREW JOHNSON, OF TACOMA, WASHINGTON

PARACHUTE CONSTRUCTION

Application filed December 27, 1927. Serial No. 242,625.

This invention relates to improvements in parachutes and has for its principal object to provide a parachute having means in connection therewith for positively insuring its opening regardless of wind, tangled ropes or other adverse conditions. More specifically, it is the object of this invention to provide a parachute comprising the usual envelope or cover wherein there is contained a plurality of hoops adapted to be collapsed together, when it is desired to close the parachute for storage on a ship or plane, but which will be drawn apart by the weight of a suspended load, and to thereby spread the parachute to open position; the hoops being connected for limited movement toward spaced relation by an open mesh, sleeve-like connection, which, at the upper end is attached to the top of the parachute, and at the lower end is connected with the seat or other means from which the load is suspended.

Other objects of the invention reside in the various details of construction and in the combination of parts as is hereinafter described.

In accomplishing these objects, I have provided the improved details of construction, the preferred forms of which are illustrated in the accompanying drawings, wherein—

Figure 1 is a side view of a parachute constructed in accordance with the present invention; the parachute being shown in open position and with a part of the cover or envelope broken away for better illustration.

Figure 2 is a view of the parachute when collapsed.

Figure 3 is a longitudinal section of the parachute when open.

Figure 4 is a perspective view of the parachute in use.

Referring more in detail to the drawings—

1 designates the cover, or envelope, of the parachute which is of an inverted, bag-like form when open, and which has a plurality of ropes, or the like, 2, attached to its lower edge at equally spaced intervals, and which extend downwardly in a convergent manner and are connected to a ring 3 to which a seat 4, or other support, is attached.

Contained within the envelope, is an opening means consisting of a plurality of hoops 5 disposed in vertically spaced planes coaxial of the envelope of the parachute when open and which are joined together by a net-like sleeve 6, which, at its upper end, is attached to the upper, closed end of the envelope 1 and, at its lower end, is connected by a cable 7 with the link 3. This cable 7 continues upwardly beyond its connection with the lower end of the sleeve and is connected also to the top of the parachute, as shown in Figure 1.

When the parachute is not in use, it is collapsed together as shown in Figure 2, by folding the cover and net inwardly between the hoops in an accordion-like manner, and permitting the hoops then to collapse together. When the device is to be used, the load is attached to the ring 3 and dropped. This draws out the envelope and, at the same time, draws out the hoops and their connecting sleeve to the extended position of Figure 3. This drawing out of the sleeve and hoops spreads the envelope to open position, as in Figure 1.

If it should be desired, a canvas sleeve could be used to connect the hoops and this extend from the top to the lower hoop to serve as a second or inner parachute.

A parachute so constructed is positive in its opening and is safer in use than the ordinary type which may be fouled by wind or tangled rope. It may be put to various uses for airship, parachute and aeroplane use.

Having thus described my invention, what I claim as new therein and desire to secure by Letters-Patent, is:

A parachute of the character described, comprising an inverted, bag-like envelope, load suspending means attached to the open edge of the envelope, a series of hoops of graduated diameters adapted to be collapsed with the envelope substantially into the same plane, a sleeve of open mesh connecting the hoops in spaced relation axially of the parachute, said sleeve being connected at its upper end to the top of the envelope and at its lower end to the load suspending means; said envelope and sleeve being adapted to be collapsed and also being adapted to be drawn out by a weight applied to the load suspending means to open the envelope; said hoops being of substantially the same diameter as the envelope in the planes of their open position.

Signed at Seattle, Washington, this 15th day of November, 1927.

ANDREW JOHNSON.